INVENTOR
ALFRED BAUER

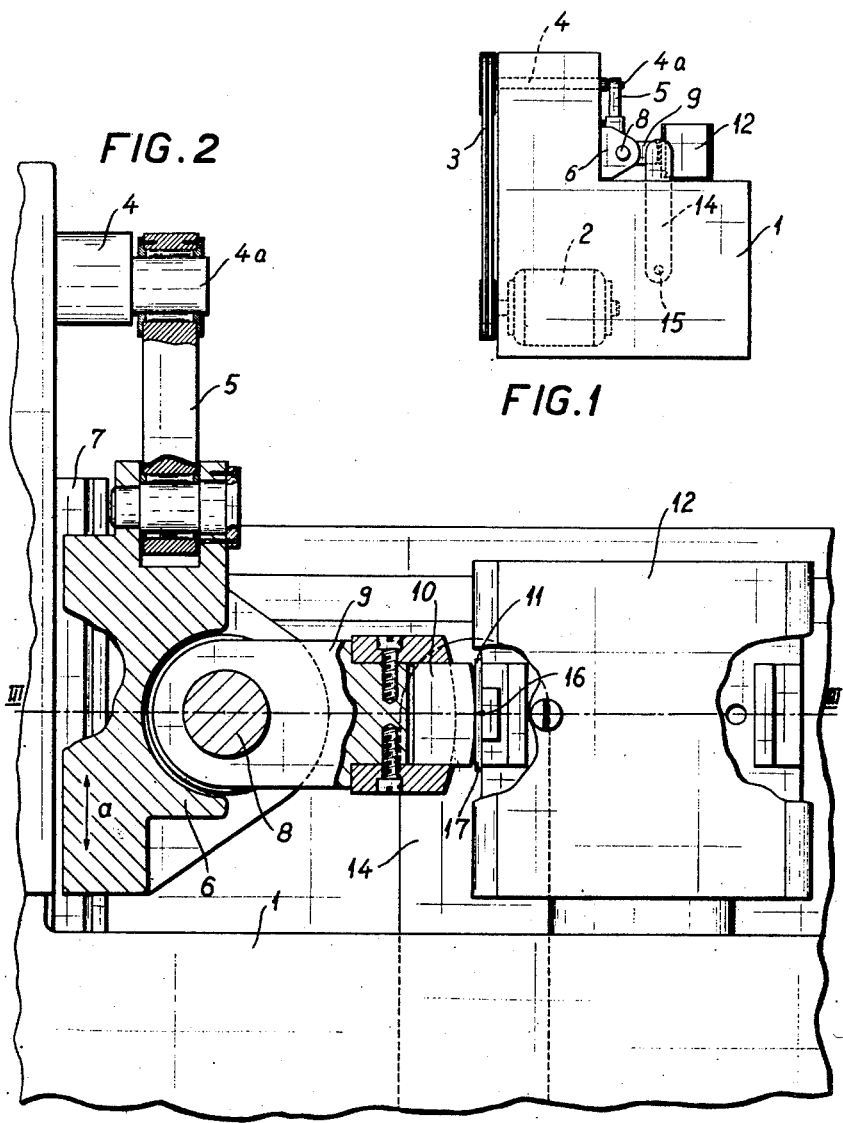

ATTORNEY

United States Patent Office 3,019,723
Patented Feb. 6, 1962

3,019,723
METHOD OF PRESSING BY ROLLING BY MEANS OF AN EMBOSSED WHEEL AND PRESSING MACHINE FOR CARRYING OUT THE SAID METHOD
Alfred Bauer, 18a Rue des Jeannerets, Le Locle, Switzerland
Filed June 3, 1960, Ser. No. 33,816
5 Claims. (Cl. 101—5)

The present invention relates to a method and apparatus for shaping a workpiece using a rotary pressing or shaping member.

In the methods of pressing or shaping by rolling hitherto known, in which there is employed an embossing or shaping member, the member is constrained to turn through an angle equal to that which would be imparted thereto by merely rolling on the surface to be pressed. The pressing produces a compression of the material of the workpiece such that the material of the workpiece tends to spread out on either side of the center of the pressing zone. This spreading impairs the precision such as of a relief obtained through employing a relief producing shaping die. An outstanding object of the present invention is to obviate this disadvantage by imparting to the shaping member a degree of sliding movement in relation to the surface to be pressed, which sliding movement is such that in the course of the rolling the shaping or embossing member tends constantly to return the material of the workpiece toward the center of the pressing zone.

In accordance with the present invention a rectilinear reciprocating movement is imparted to a sliding block on which is rotatably mounted a work shaping die member having a work shaping end to contact the workpiece at a working station. Movement of the block imparts rolling movement to the work shaping end of the member relative to the workpiece, and the shaping member is simultaneously caused to carry out a rotational movement through an angle different from that which would be imparted thereto by simple rolling on the surface to be pressed, the whole in such manner that a sliding movement of the work shaping end of the shaping member relative to the surface occurs in the course of the rolling.

The apparatus is characterised by a control device imparting to the shaping member a rotating movement, the angular value of which is different from that which would be imparted to the member by a mere rolling action on the surface to be pressed. A sliding movement of the work shaping member in relation to the surface of the workpiece, in fact is introduced in the course of the rolling.

A constructional form of apparatus in accordance with the invention is illustrated, by way of example, in the accompanying drawings, wherein:

FIGURE 1 is a diagrammatic elevational view of a machine for pressing characters or type for computing machines;

FIGURE 2 is an elevational view of a detail of FIGURE 1, on an enlarged scale, partly in section;

Figure 3:
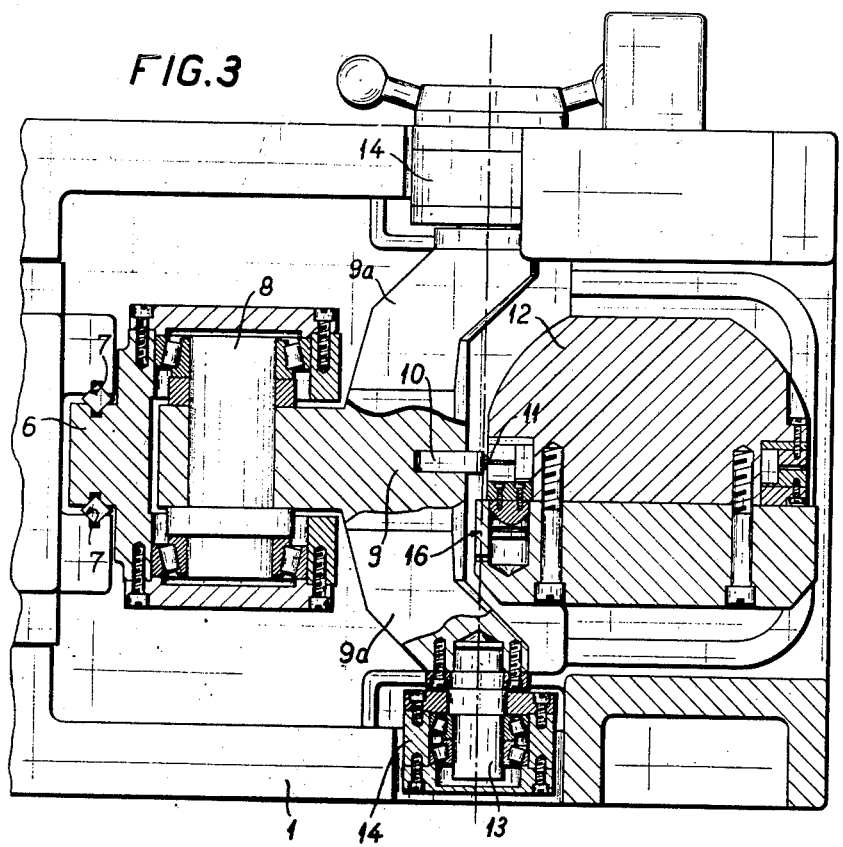
FIGURE 3 is a section along the line III—III of FIGURE 2.

The machine comprises a frame 1 enclosing a motor 2 which drives through belts 3 a shaft 4 terminating in an eccentric journal 4a. The journal supports the head of a connecting rod 5 which is pivotally connected at its other end to a follower or sliding block 6 movable on a vertical guide or slideway 7 on the frame of the machine.

Sliding block 6 is pivotally interconnected at 8 with a work shaping member 10 and the pivotal connection includes a support 9 which is rotatable with the member about the pivot axis. The work shaping member 10 has a work shaping end adapted to contact a workpiece 11.

The member or workpiece to be pressed, which is here a character blank 11 of a computing machine, is positioned at a work station by a work support 12 such as a charging device forming a flat circular conveyor.

When the motor 2 drives the shaft 4, the journal 4a imparts to the follower or sliding block 6 and pivot 8 through the connecting rod 5 a rectilinear reciprocating movement in the direction of the arrow a (FIGURE 2).

In the course of this movement, the support 9 undergoes a rotational movement about its pivot pin 8. For this purpose, the support 9 comprises two lateral arms 9a (FIGURE 3) each terminated by a pin 13. Each pin 13 is pivotally connected to the end of a connecting link 14 which is pivotally connected at its other end at 15 to the frame of the machine. It is to be noted that the pins 13 are coaxial, their common axis 16 (FIGURES 2 and 3) coinciding with a generatrix of the cylindrical working surface 17 of the work shaping member, and being parallel to the pivot pin 8 of the support 9 on the sliding block 6.

Figure 5:
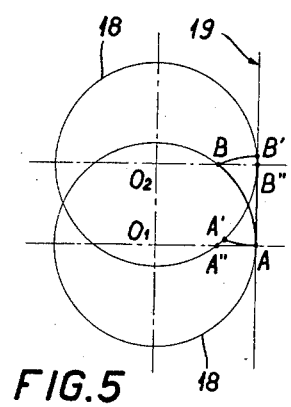

The links 14 constitute a control device which constrains the work shaping member 10 to rotate about the pin 8, in a manner whereby the angular value of the rotation differs from that which would result from simple rolling of the member on the surface to be pressed. Consequently the shaping member slides slightly on the workpiece surface. FIGURE 5 diagrammatically illustrates this feature. A circle 18 represents a wheel in two different positions, in one of which its centre is denoted by $O_1$ and in the other by $O_2$. In order to change from one position to the other, the wheel 18 can roll normally on the rolling surface denoted by 19, in which case its arc of a circle AB is developed at AB' on the surface 19, the point A coming to A'. However, if, by means of an appropriate mechanism, the centre O of the wheel 18 is caused to move from $O_1$ to $O_2$, and the wheel is at the same time caused to turn less rapidly than it would turn when normally rolling, that is to say, to carry out a rotation through an angle smaller than that which would be imparted by normal rolling, the point B will not move to B', but to B", this point B" being situated on the nearer side of B' in relation to A. There is thus produced a sliding movement, due to which the arc of a circle is developed on the surface 19 in the form of a section AB" which is shorter than AB. The point A comes to A" on the radius $O_1A$.

Figure 4:
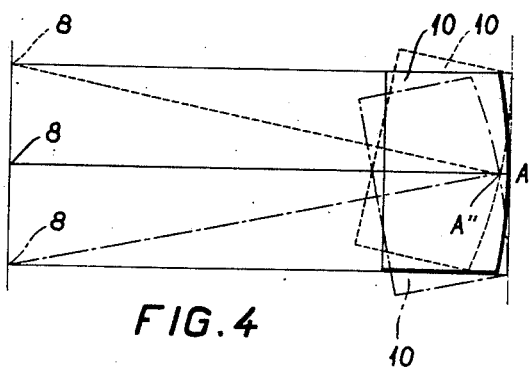
FIGURES 4 and 5 are two functional diagrams representing the manner in which the pressing is carried out by means of the machine of the preceding figures.

The machine illustrated and described constitutes a mechanism by means of which this function can be performed since, on the one hand, the follower or sliding block 6 positively shifts the centre of rotation 8 of the shaping member 10, while on the other hand the control member 14 imposes a component of force on the work shaping die member which causes the shaping member to turn at a speed different from that which would be imparted thereto by a simple rolling on the surface to be pressed. FIGURE 4 diagrammatically illustrates this operation. In this figure, the member 10 is represented by unbroken lines in its central position, and by dash-dotted and chain lines respectively in its two extreme positions. In the course of the displacements of the member 10, due to which it changes from its central position to one or the other of its extreme positions, its point A, which corresponds to the point A of the diagram of FIGURE 5, changes from the position A to the position A". The trajectory from A to A" is an arc of a circle which, by reason of the size of its radius, which is equal to the distance between the axes of the connecting links 14, and by reason of the very small amplitude of movement, can without difficulty be assimilated to the straight line AA" of FIGURE 5.

By reason of this sliding movement, the material of the part to be pressed is slightly squeezed towards the center or a die shaping location of the pressing zone, which squeezing obviates the spreading which could otherwise occur, and thus increases the precision of the relief obtained.

What I claim is:

1. A method of shaping a workpiece which comprises contacting the workpiece with a shaping die member having a work shaping end adapted to roll against the workpiece in alternately reversing directions with respect to a die shaping location within a working zone of the workpiece and while said shaping die member is supported at a point spaced from the working zone, moving the work shaping end of said die member in rolling pressure exerting relation in alternately reversing directions with respect to the die shaping location within the working zone of the workpiece, and simultaneously imposing force upon the work shaping end of said die member at a point spaced from said support point and said working zone for said die member to squeeze material of the workpiece within the working zone toward the die shaping location in the working zone.

2. Apparatus for die shaping a workpiece at a work station and within a working zone of the workpiece, said apparatus comprising a work shaping die member having a work shaping end to contact the workpiece and pivot means spaced from said work shaping end, said pivot means supporting said work shaping end for rolling die shaping movement along said workpiece and with respect to a die shaping location within said working zone, means to move said pivot means alternately to opposite parallel axial positions of the pivot means for said work shaping end of said work shaping die member to undergo rolling movement alternately in opposite directions with respect to the die shaping location within said working zone, and means engaged with said work shaping die member and active to impose force through a point on said die member spaced from said pivot means and said work shaping end for the work shaping end of the member to squeeze material of the workpiece within the working zone toward the die shaping location in the zone while the workpiece is being subjected to the rolling die shaping movement of said die member.

3. Apparatus for die shaping a workpiece at a work station and within a working zone of the workpiece, said apparatus comprising a frame, support means on said frame adapted to sustain the workpiece at the work station, a work shaping die member having a work shaping end to contact the workpiece and pivot means spaced from said work shaping end, said pivot means supporting said work shaping end for rolling die shaping movement along said workpiece and with respect to a die shaping location within said working zone, means to move said pivot means alternately to opposite parallel axial positions of the pivot means for said work shaping end of said work shaping die member to undergo rolling movement alternately in opposite directions with respect to the die shaping location in said working zone, and connector means pivotally connected with said frame and said work shaping member on axes parallel to the axis of said pivot means and active to impose force through a point on said die member spaced from said pivot means and said work shaping end for the work shaping end of the member to squeeze material of the workpiece within the working zone toward the die shaping location in the zone while the workpiece is being subjected to the rolling die shaping movement of said die member.

4. Apparatus of the character indicated in claim 3, wherein said connector means is pivotally connected to said work shaping die member on an axis which substantially coincides with the work shaping end of said member.

5. Apparatus of the character indicated in claim 3, wherein said means to move said pivot means comprises guide means on said frame, a reciprocable guide follower mounted on said guide means and supporting said pivot means, and means to reciprocate said follower along said guide.

References Cited in the file of this patent
UNITED STATES PATENTS

| | | |
|---|---|---|
| 2,309,645 | Harrington | Feb. 2, 1943 |
| 2,328,638 | Fuller | Sept. 7, 1943 |
| 2,441,862 | Wutscher | May 18, 1948 |
| 2,598,114 | Dilworth | May 27, 1952 |
| 2,818,015 | Fiala | Dec. 31, 1957 |
| 2,936,700 | Bauer | May 17, 1960 |